Feb. 20, 1934.  A. L. LUCE  1,948,223
MOTOR VEHICLE BODY CONSTRUCTION
Filed Nov. 5, 1931  3 Sheets-Sheet 1
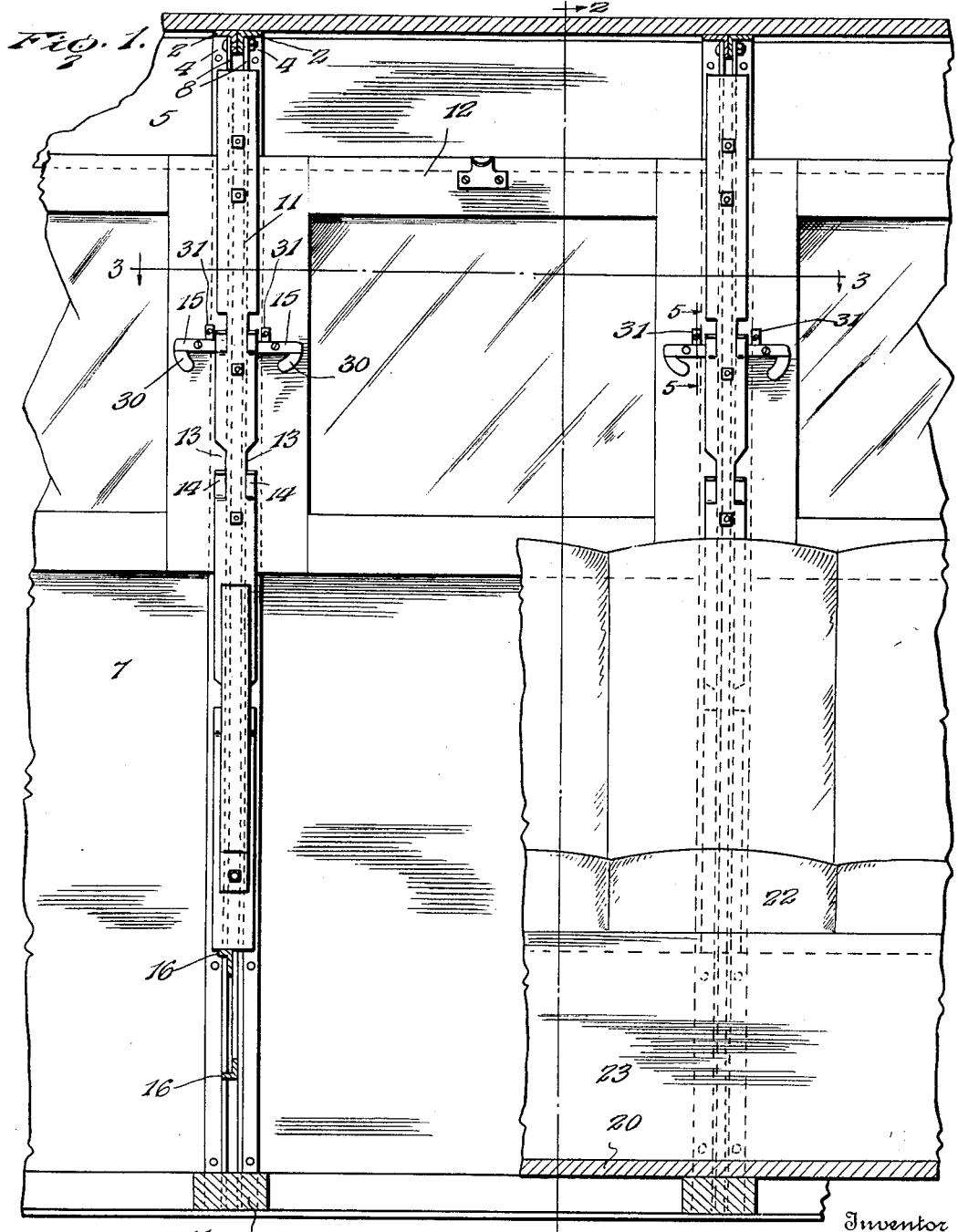

Feb. 20, 1934. A. L. LUCE 1,948,223
MOTOR VEHICLE BODY CONSTRUCTION
Filed Nov. 5, 1931 3 Sheets-Sheet 2
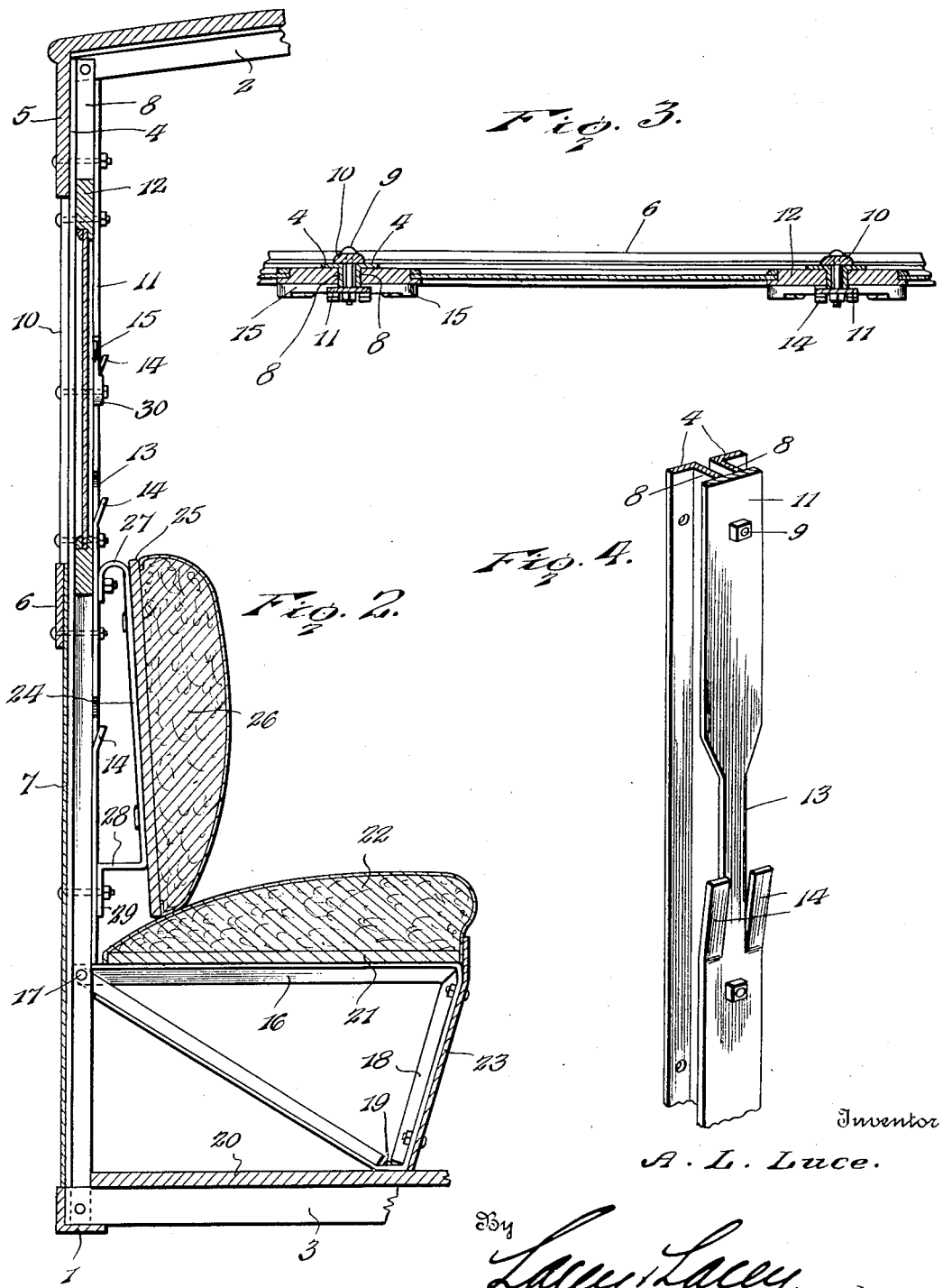

Feb. 20, 1934. A. L. LUCE 1,948,223
MOTOR VEHICLE BODY CONSTRUCTION
Filed Nov. 5, 1931 3 Sheets-Sheet 3
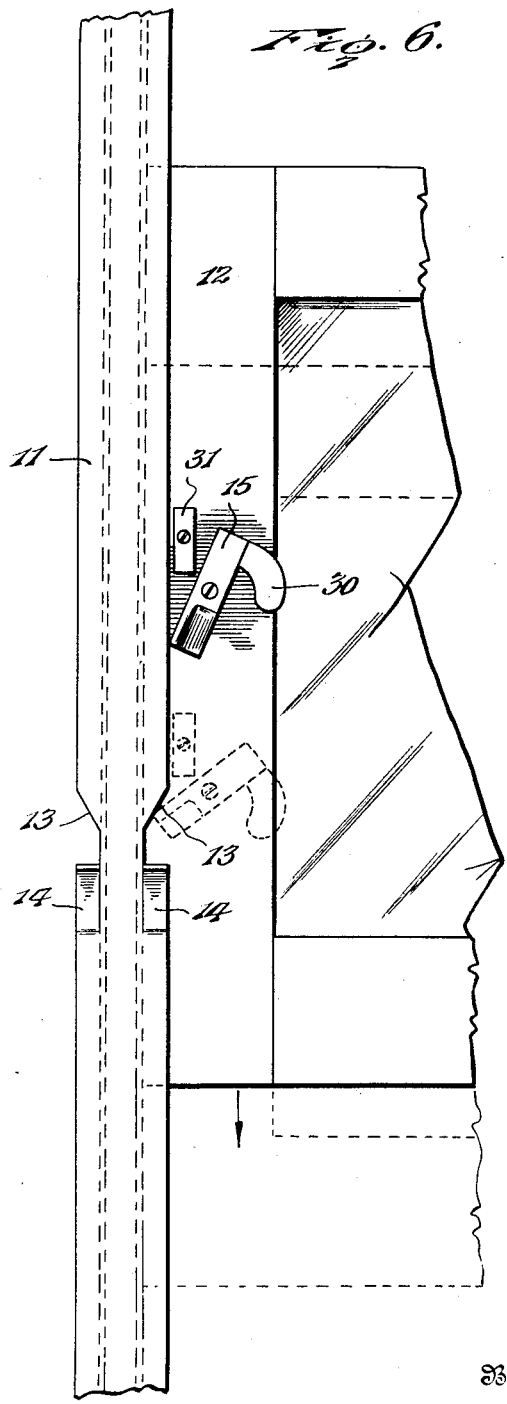
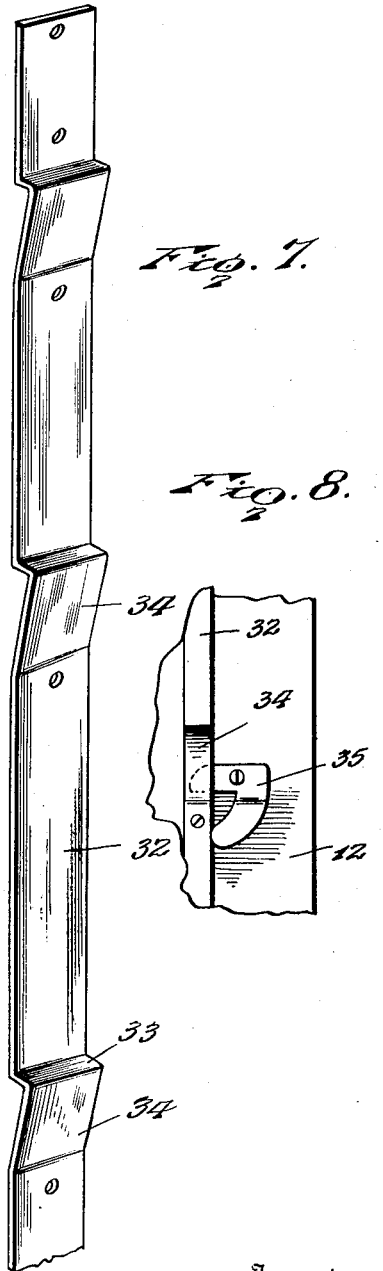
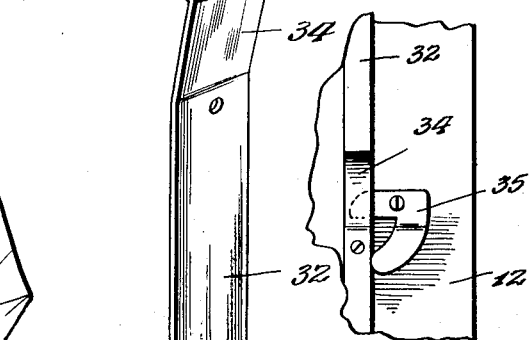

Patented Feb. 20, 1934

1,948,223

UNITED STATES PATENT OFFICE 1,948,223

MOTOR VEHICLE BODY CONSTRUCTION

Albert L. Luce, Perry, Ga.

Application November 5, 1931. Serial No. 573,218

2 Claims. (Cl. 296—28)

This invention relates to automobile body construction, and more particularly to the construction of motor busses, the object being to provide a strong frame for the sides of the bodies which will permit the windows to be conveniently mounted and also furnish strong supports for the seat and the back rest. Another object of the invention is to provide an efficient latch whereby a window of the vehicle may be easily secured in a set position and held against rattling. The invention is illustrated in the accompanying drawings and will be hereinafter fully described and defined.

In the drawings,

Figure 1 is a view, partly in elevation and partly in longitudinal section, of a portion of a motor vehicle having my invention embodied therein, Fig. 2 is a transverse section on the line 2—2 of Fig. 1, Fig. 3 is a horizontal section on the line 3—3 of Fig. 1, Fig. 4 is an enlarged detail perspective view of a portion of the frame, Fig. 5 is a detail section on the line 5—5 of Fig. 1, Fig. 6 is an elevation, on a larger scale, showing different positions of the latch, Fig. 7 is a detail perspective of a modification, Fig. 8 shows a modification of the latch.

In carrying out the present invention, I provide standards which extend between the chassis sills 1 and the roof beams 2 and are firmly secured to said sills and beams, transverse floor beams 3 being secured to the lower ends of the standards, as will be understood. Each standard, in the specific embodiment illustrated, comprises two angle irons 4 which are disposed with their outer webs arranged to abut the members 5, 6 and 7 constituting the sides of the vehicle. The other webs 8 of these angle bars are disposed in spaced relation and extend inwardly, as shown most clearly in Fig. 4, thereby providing an open space through which securing bolts 9 may pass to secure the outer beading or covering strips 10 in place, and also secure the inner bars 11 which bridge the edges of said webs 8, as clearly shown in Fig. 4. The beads or strips 10 provide an attractive finish for the outer portion of the vehicle and also prevent the entrance of the elements between the members of the standards, and it will be understood that the bolts 9, or similar bolts, will be utilized to secure the side members 5, 6 and 7 to the standards. The roof beams 2 are preferably composed of two angle bars disposed with their inwardly projecting webs abutting and fitting between the upper ends of the members of the standards, as will be understood upon reference to Fig. 1. The exact construction thus specifically described, however, need not be employed, and the angle irons 4 may be replaced by channel bars having a connecting web, the essential feature being the provision of standards which will present channels on their opposite sides. In the construction specifically illustrated and described, the channels are provided by the webs 4 of the angle bars and the projecting edge portions of the inner strips 11, as shown in Figs. 3 and 4. The channels receive the edges of the window sashes 12 and guide the windows in their raising and lowering movements, as shown clearly in Fig. 3. At intervals in the height of the inner strips 11, the edge portions of said strips are cut away, as shown at 13, and, at the lower ends of these cut away portions, tongues 14 are formed and caused to project slightly inwardly from the strips, as shown, the upper walls of the recesses or cuts being obliquely disposed. The windows are equipped at their sides with latches 15 which consist of short bars pivoted upon the sashes adjacent the edges thereof and adapted to engage behind the tongues 14 and bind between the same and the sashes, as shown in Fig. 5, the latch bars being preferably tapered or wedge-shaped in cross section in order to firmly bind behind the inclined tongues or projections 14, as clearly shown. The latch is pivoted between its ends and its end more remote from the edge of the sash is acted upon by means which tends constantly to swing its opposite end upward, a weight 30 being illustrated. It is obvious, however, that a spring may be arranged to bear upon the end of the latch. Above the latch, a stop block 31 is secured upon the sash in position to be engaged by the latch and prevent it from swinging upwardly past a horizontal position. The stop 31, however, may be omitted by making the weighted arm of the latch long enough to bear against the edge of the keeper strip when the latch is in working position. Such a latch is shown at 35 in Fig. 8.

The action of the latch will be understood upon reference to Fig. 6. Assuming that the window is to be raised, it is lifted in the usual manner, and the free end of the latch will be thereby caused to ride on the upper oblique wall of the recess or cutaway portion 13 and swing to the position shown by dotted lines whereupon it will ride on the edge of the strip or bar 11, as shown by full lines, as the upward movement continues. As the latch clears an upper offset or tongue 14, it will swing into the position shown in Fig. 1 whereupon, if the lifting force be withdrawn from the window, the weight of the window will cause the latch to lock the window as will be understood upon reference to Fig. 5, the stop 31 preventing movement of the latch from behind the strip or bar 11 the edge of which constitutes a keeper for the latch. When the window is to be shifted to a lower position, it is first raised sufficiently to release the latch and the latch is then grasped and held while the window is shifted to carry the latch to a position below that from which it has just been released.

In Fig. 7 is shown an inner bridging or keeper strip 32 which is corrugated or crimped at intervals instead of being cut away, the shoulders 33 acting upon the latch in the same manner as the oblique walls of the recesses 13, and the offsets 34 having the same function as the tongues 14.

Near the lower end of each standard is secured a triangular bracket 16 which constitutes a seat support and forms a brace for the side of the vehicle. This bracket consists of a length of angle bar bent into triangular form and having its ends brought together and disposed between the parallel webs 8 of the standards and secured by a bolt inserted transversely therethrough, as shown at 17. One side or arm of the triangular bracket is disposed horizontally, and the other arms converge downwardly from said horizontal arm, the front arm being inclined slightly toward the side of the vehicle, as shown at 18, and a short flat portion 19 being provided to rest upon and be secured to the floor 20 of the vehicle, so that a firm support for the bracket and the seat will be furnished and the side of the body will be securely braced. The seat board 21 rests upon the horizontal arms of the several brackets and preferably carries an upholstered seat 22, while extending longitudinally of the vehicle and secured to the several arms 18 is a facing strip or panel 23.

Above the several brackets 16, vertically extending brackets 24 are carried by the standards, and to these several brackets a back rest 25 is secured, said back rest being preferably equipped with an upholstered cushion 26, as will be understood. The bracket 24 consists of a single bar or metal strap having a return bend 27 formed at its upper end to be engaged over one of the securing bolts whereby the side members 6 and 7 and the facing strip 11 are secured together and against the standard, while the lower end of the bracket is bent horizontally, as shown at 28, to extend to the facing strip 11 and is then turned downwardly at a right angle, as shown at 29, and there engaged with one of the securing bolts, whereby the bracket 29 will be firmly held by the standard. The extremities of this bracket may be slotted so that, when necessary, the back may be removed by merely lifting the several brackets to release them from the securing bolts.

It will be readily observed that I have provided an exceedingly compact, simple and strong construction whereby a firm support for the seat and back rest will be provided and the windows will be accommodated so that they may move readily vertically and may be locked in fully raised or partly raised positions.

Having thus described the invention, I claim:

1. In a vehicle body construction, stationary standards comprising bars each having inner and outer webs disposed at right angles to each other, the inner webs of the bars being parallel and spaced apart, covering members secured against the outer sides of the outer webs, facing strips bridging the space between the inner webs and extending laterally beyond said inner webs in spaced parallel relation to the outer webs to form oppositely disposed guide channels for a vertically movable window sash, and securing bolts inserted through said strips and through the spaces between the inner webs and engaging the covering members.

2. In a vehicle body construction, stationary standards comprising separate angle bars each having inner and outer webs disposed at right angles to each other, the inner webs of adjacent angle bars being parallel and spaced apart, side body members secured to the outer webs, covering strips secured to the outer faces of the outer webs, facing strips bearing against the ends of the inner webs and bridging the space between said inner webs, said facing strips being extended laterally beyond said inner webs in spaced parallel relation to the outer webs to form oppositely disposed guide channels for a vertically movable window sash, and securing bolts extending through the facing strips and the space between the inner webs and engaging the covering strips for detachably securing said strips in engagement with the standards.

ALBERT L. LUCE. [L. S.]